(12) United States Patent
Herrera et al.

(10) Patent No.: US 7,582,349 B1
(45) Date of Patent: Sep. 1, 2009

(54) MORPHING CELLULAR STRUCTURE

(75) Inventors: Guillermo A. Herrera, Winnetka, CA (US); William Barvosa-Carter, Ventura, CA (US); Cameron Massey, Hawthorne, CA (US); Geoffrey P. McKnight, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 310 days.

(21) Appl. No.: 11/051,758

(22) Filed: Feb. 3, 2005

(51) Int. Cl.
| | |
|---|---|
| *B60R 19/20* | (2006.01) |
| *B32B 1/04* | (2006.01) |
| *B21D 39/00* | (2006.01) |
| *B32B 3/12* | (2006.01) |
| *B32K 1/20* | (2006.01) |
| *B21D 52/88* | (2006.01) |
| *B60J 7/00* | (2006.01) |
| *B31D 3/02* | (2006.01) |

(52) U.S. Cl. .................. 428/116; 428/69; 428/604; 428/593; 428/598; 428/686; 428/12; 296/187.02; 296/187.03; 296/187.08; 296/187.09; 29/897.2; 293/107

(58) Field of Classification Search .......... 428/68, 428/116, 604, 593, 598, 686; 29/897.2; 296/187.02, 296/187.03, 187.08, 187.09; 293/107
See application file for complete search history.

(56) References Cited

U.S. PATENT DOCUMENTS

| | | | |
|---|---|---|---|
| 4,044,358 A | 8/1977 | Manning | |
| 5,164,129 A | 11/1992 | Douglas | |
| 2002/0101008 A1 | 8/2002 | Sokolowski | |
| 2004/0197519 A1* | 10/2004 | Elzey et al. | 428/68 |
| 2005/0158573 A1* | 7/2005 | Elzey et al. | 428/593 |

* cited by examiner

*Primary Examiner*—Timothy M Speer
*Assistant Examiner*—Gordon R Baldwin
(74) *Attorney, Agent, or Firm*—Tope-McKay & Assoc.

(57) ABSTRACT

The present invention relates to a morphing cellular structure. The morphing cellular structure comprises a group of unit cells with each unit cell configured to have a cellular geometry. The group unit cells are formed of an active material, where the active material has both a first state and a second state. The active material is responsive to an actuation signal such that when the actuation signal is actuated, the active material is deformed from the first state to the second state, thereby changing the volume of each unit cell affected by the actuation of the actuation signal and morphing the cellular structure. Furthermore, both a passive material and at least one additional active material can be attached with the active material, allowing a user to selectively change the shape of the cellular structure.

31 Claims, 11 Drawing Sheets

100

102

100

100
100
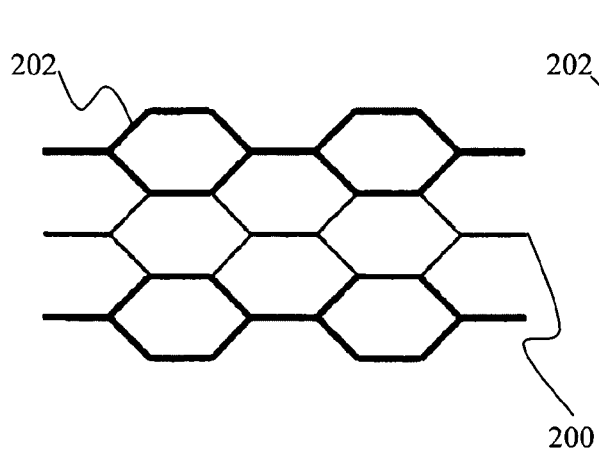
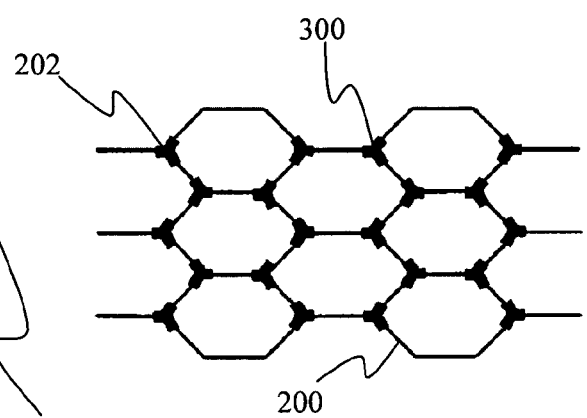
FIG. 2
FIG. 3

| MATERIAL | Typical actuation signal | Typical signal actuation element or means | Type of deformation | Typical structural forms |
|---|---|---|---|---|
| Active Materials: | | | | |
| Piezoelectrics and Electrostrictives | Electric field | Parallel or coaxial electrodes, high potential | May be used directly in extensional/contractile implementations; typically coupled with a passive material structure (e.g. a stiff steel backing) to produce bending or twisting action | |
| Piezo Ceramics | Electric filed | Parallel or Coaxial electrodes | Can expand or contract when activated; | Film, rod, fiber, sheet or bulk |
| Piezo Polymers (e.g. PVDF) | Electric Field | Parallel or Coaxial Electrodes | Typically electrostrictive; expand when activated | Film, rod, fiber, sheet or bulk |
| Shape Memory Alloys | Thermal field | Resistive heating through bulk, heating using nearby heat source (radiative, conductive, or convective) | Wire, film, or foil forms typically processed to contract upon heating; can expand, bend, or twist upon activation; can be one-way (requires bias force to reset) or two-way (distinct high temperature and low temperature shapes); Foam form can be used to contract or expand on heating; may be combined with passive structure to bending or torsion geometries | Wire, film, sheet, fiber, or bulk |

FIG. 5A

| MATERIAL | Typical actuation signal | Typical signal actuation element or means | Type of deformation | Typical structural forms |
|---|---|---|---|---|
| Active Materials: | | | | |
| Liquid Crystal Elastomers | Thermal, optical, Field | Resistive heating through bulk, heating using nearby heat source (radiative, conductive, or convective) Optical: laser, arc lamp, sunlight; may be remotely activated | Typical current materials contract upon heating or optical activation. | Sheet, film, rod (or "wire" like), bulk |
| Magnetic Shape Memory Alloys | Magnetic or thermal field | Magnetic field from a permanent magnet brought into proximity, or a generated using current through a coil; Also thermal (see shape memory alloys above) | Typical materials expand in perpendicular to applied magnetic field. | Bulk, film, rod |
| Magnetostrictives | Magnetic field | Magnetic field from a permanent magnet brought into proximity, or a generated using current through a coil; | Can expand or contract depending on magnetic bias; may be combined with passive structure to bending or torsion geometries | Film, bulk, powder composite |

FIG. 5B

| MATERIAL | Typical actuation signal | Typical signal actuation element or means | Type of deformation | Typical structural forms |
|---|---|---|---|---|
| Active Materials: | | | | |
| Shape Memory Polymer (SMP) | Thermal field | Heating using nearby heat source (radiative, conductive, convective, or exothermic chemical reaction) | Wire, film, or foil forms reset to memorized shape upon heating; can expand, bend, or twist upon activation; only one-way (requires external force to deform, does not do reversible work); Foam form can be used to contract or expand on heating; may be combined with passive structure to bending or torsion geometries | Fiber, wire, rod, film, sheet, or bulk |
| Electronic EAPs (dielectric elastomers) | Electric field | Parallel or coaxial electrodes: typically conductive through large (>100%) deformations; high voltages | Expand along length or in plane of electrodes; may be combined with passive structure to bending or torsion geometries | Film or coaxial |
| Ionic Polymer Metal Composites (IPMCs) | Electric field, chemical field | Parallel or coaxial electrodes; low voltages; changes in chemical environment (e.g. applied via flowing fluid or gas, or changes in background environment) | Bending or torsion inherent to material | Sheet |
| Ionic Polymer Gels | Electric field, chemical field | Parallel or coaxial electrodes; low voltages; changes in chemical environment (e.g. applied via flowing fluid or gas, or changes in background environment) | Volume expansion; can be constrained to produce linear or planar motion, extension or contraction; may be combined with passive structure to bending or torsion geometries | Film, sheet, bulk |

FIG. 5C

| MATERIAL | Typical actuation signal | Typical signal actuation element or means | Type of deformation | Typical structural forms |
|---|---|---|---|---|
| Active Materials: | | | | |
| Conductive polymers | Electric current, chemical field | Applied using battery, power cell, etc.... | Extension or contraction; may be combined with passive structure to bending or torsion geometries | Film, sheet, filament, rod |
| Carbon nanotube actuators | Electric field, chemical field | Parallel or coaxial electrodes; low voltages; changes in chemical environment (e.g. applied via flowing fluid or gas, or changes in background environment) | Extension or contraction; may be applied to bending or torsion geometries with passive structure | Typically a composite with a polymer matrix; film, sheet, filament, rod |
| Photostrictives | Light | Laser, arc lamp, sunlight; may be remotely activated | Can contract or expand depending on configuration | Bulk, film, sheet, rod, "wire" |
| PAN Fibers | pH change | Electrochemical or fluid transport that enables a change between acidic and basic solutions | Length/Volume change of the fibers. Shorten in acidic environment and lengthens in basic environment. | Annealed Fibers |
| Ferroelectrets | Electric field | Parallel or concentric electrodes, High potential | Contraction under applied signal, | Film, foams |

FIG. 5D

MORPHING CELLULAR STRUCTURE

FIELD OF INVENTION

The present invention relates to a morphing cellular structure that includes an active material that responds to external stimuli by changing its shape. More specifically, the present invention relates to "active materials" (materials that change shape in response to stimuli) and "passively shapeable materials" (materials that are controllably malleable) that are used in combination and configured in a cellular geometry to permit the re-shaping of a device into at least one desired shape.

BACKGROUND OF INVENTION

The field of smart materials and intelligent structures has been gradually developing over the past few decades, increasingly enabled by technological advances in the areas of sensors, engineering materials, and actuators. The basis of many actuator and sensor technologies has increasingly been found in emerging "active materials." Active materials, as a category, are materials that change their shape in response to an external control stimulus, typically a field, such as a thermal, magnetic, or electric field, but also radiation (light) or a changing chemical environment. Materials in this broad category include several classes, often delineated by the stimulus and material type: shape memory alloys, (SMAs), shape memory polymers (SMPs), piezoelectric ceramics, magnetostrictives, and electroactive polymers. Within each of these classes, there are many materials; e.g., within electroactive polymers alone there are a wide variety of low- and high-voltage-activated materials with widely-varying properties, such as ionic-polymer metal composites, conductive polymers, gels, and others.

Expandable structures have been applied to a myriad of uses. For example, when transporting an object into outer space, it may be advantageous to have the object compacted during the trip so that it may be deployed into its full form once in outer space. Attempting to fulfill such a need, non-active cellular metal or composite structures, such as those made by Hexcel Corporation, located at 281 Tresser Blvd., Stamford, Conn. 06901, have been used in space, aerospace and in automotive applications.

U.S. Pat. No. 5,164,129, issued to Douglas, discloses a self-deploying structural element that can be used as the building block for deployable structures. However, the Douglas invention is limited to forming rigid tubular structures and does not provide for other shapes.

Another deployable structure is described in U.S. patent application Ser. No. 09/771,455, issued to Sokolowski. The Sokolowski application describes a shape memory polymer polyurethane foam that can be compacted, and when heated to a prescribed temperature will recover its original shape and volume. Although the Sokolowski invention provides a reformable material, it is limited to foam applications.

U.S. Pat. No. 4,044,358, issued to Manning et al., describes a self-erectable structure that uses active materials to erect the structure to a predefined shape for radar attenuation. Although the Manning patent discloses using active materials, the Manning invention erects itself by using spring-like elements that actuate when physically unconstrained to deploy the structure and not necessarily by using a material with a controllable recoverable strain. In other words, the structure described in the Manning patent is not active in the sense that when an external force permanently deforms the "active" members, the members are no longer "active," i.e., they cannot be actuated and to recover a memorized state.

Thus, a continuing need exists for a structure using tailorable, active materials that can be actuated to recover a memorized state.

SUMMARY OF INVENTION

The present invention relates to a morphing cellular structure. The morphing cellular structure comprises a group of unit cells with each unit cell configured to have a cellular geometry. The unit cells are formed of a first active material, where the first active material has both a first state and a second state. Each unit cell has a configuration, where the configuration of each unit cell, while the first active material is in the first state, is different from the configuration of each unit cell while the first active material is in the second state. The first active material is responsive to a first actuation signal such that when the first actuation signal is sent, the active material is deformed from the first state to the second state, thereby changing the configuration of each unit cell affected by the actuation of the first actuation signal and morphing the cellular structure.

In another aspect, the configuration is measured as a volume, such that each unit cell has a volume where the volume of each unit cell, while the first active material is in the first state, is different from the volume of each unit cell while the first active material is in the second state.

In yet another aspect, the cellular geometry is selected from a group consisting of hexagonal, rectangular, triangular and trapezoidal. Furthermore, the cellular structure is configured to be morphed by actuating the actuation signal in a manner selected from a group consisting of the active material being a self sensor and deforming when self-sensing the actuation signal; the actuation signal being actively applied to all cells; the actuation signal being actively applied to a region of cells; the actuation signal being actively applied to a single cell; and each cell being affected by a neighboring cell.

In another aspect, the active material is deformable in a manner selected from a group consisting of being deformable from a first state to a second state; being deformable from both a first state to a second state and from a second state to a first state; and being deformable between a plurality of states. When the active material is deformable from a first state to a second state, the deformation is selected from a group consisting of being a single deployment and being a re-settable deployment, where the active material is re-settable through an external reset signal, allowing for at least one additional deployment. When the active material is deformable from both a first state to a second state and from a second state to a first state, the deformation is selected from a group consisting of deforming from the first state to the second state upon receiving the actuation signal and thereafter deforming from the second state to the first state when the actuation signal is removed; and deforming from the first state to the second state when an actuation signal is removed and thereafter deforming from the second state to the first state when the actuation signal is received.

Additionally, the active material is a material selected from a group consisting of shape memory alloys, shape memory polymers, piezoelectric bimorph, ionic polymer metal composites, conductive polymers, ionic polymer gels, ferromagnetic shape memory alloys, ferromagenetics, liquid crystal elastomers, dielectric elastomers, polyacrylonitrile fibers, and hard piezos.

In another aspect, the actuation signal is a signal selected from a group consisting of a temperature change, redox reaction, pH change, electromagnetic field, chemical reaction, electric current, electric field, and magnetic field.

Furthermore, the morphing cellular structure has a size and each unit cell in the morphing cellular structure is between approximately one one-thousandths and one third of the size of the morphing cellular structure.

In yet another aspect, the first state can be altered by forcedly altering the cellular geometry.

In another aspect, the present invention further comprises a second group of unit cells connected with a first group of unit cells, with each unit cell configured to have a cellular geometry. The second group of unit cells is formed of a second active material, where the second active material has both a third state and a fourth state. Additionally, each unit cell has a volume where a volume of each unit cell, while the second active material is in the third state, is different from the volume of each unit cell while the second active material is in the fourth state. Furthermore, the second active material is responsive to a second actuation signal such that when the second actuation signal is actuated, the second active material is deformed from the third state to the fourth state, thereby changing the volume of each unit cell receiving the second actuation signal and morphing the cellular structure. By including a second active material, a user can selectively morph the cellular structure by using at least one of the first and second actuation signals.

In yet another aspect, the present invention further comprises a passive material connected with the active material. The active material is attached with the passive material at a hinge joint such that actuation of the active material forces a bending moment at the hinge joint.

In another aspect, the active material is attached between at least two sections of passive material such that the active material functions as a hinge joint. In such a configuration, actuation of the active material forces a bending moment at the hinge joint.

Additionally, the cellular structure is configured to be a deployable structure.

In another aspect, the cellular structure is configured to be attached with a window and function as a deployable window shade, such that when an actuation signal is applied, the deployable window shade changes its shape to change its configuration with respect to the window.

In yet another aspect, the cellular structure is configured to hold a cup and change its shape to conform its shape with a shape of an inserted cup, whereby after a cup is placed within the cellular structure, an actuation signal can be applied to cause the cellular structure to conform its shape with the shape of the cup.

In another aspect, the cellular structure is configured to function as an air passage having a first side and a second side, and formed in such a shape that actuation of the air passage affects the flow of air from the first side to the second side, whereby when an actuation signal is applied, the air passage changes its shape to affect passage of air through the air passage.

Finally, in another aspect, the cellular structure is configured to be used as an automobile surface, allowing a deformed automobile body panel surface to return to an un-deformed state when an actuation signal is applied.

It can be appreciated by one in the art that the present invention is not limited to the cellular structure described herein, but also includes a method for forming and configuring the same.

BRIEF DESCRIPTION OF THE DRAWINGS

The objects, features and advantages of the present invention will be apparent from the following detailed descriptions of the various aspects of the invention in conjunction with reference to the following drawings, where:

FIG. 2 is an illustration of a cellular structure that includes both active and passive materials, or alternatively, a cellular structure that includes two different active materials;

FIG. 3 is an illustration of a cellular structure that includes both active and passive materials;

FIG. 5A is a table illustrating properties of various active materials;

FIG. 5B is a table illustrating properties of various active materials;

FIG. 5C is a table illustrating properties of various active materials;

FIG. 5D is a table illustrating properties of various active materials;

DETAILED DESCRIPTION

Figure 1A:
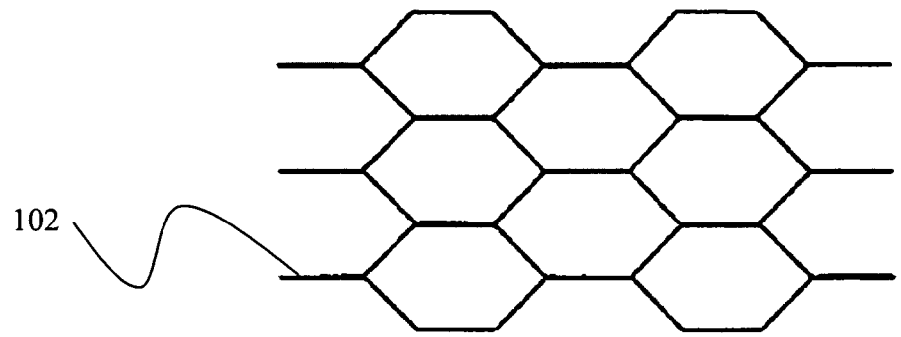
FIG. 1A illustrates a cellular structure that is made out of active materials in an expanded state, e.g., a memorized state.

The present invention relates to a morphing cellular structure and, more particularly, to a morphing cellular structure that includes active materials therein.

The following description, taken in conjunction with the referenced drawings and/or tables, is presented to enable one of ordinary skill in the art to make and use the invention. Various modifications will be readily apparent to those skilled in the art and the general principles defined herein may be applied to a wide range of aspects. Thus, the present invention is not intended to be limited to the aspects presented, but is to be accorded the widest scope consistent with the principles and novel features disclosed herein. Furthermore, it should be noted that unless explicitly stated otherwise, the figures included herein are illustrated qualitatively and without any specific scale and are intended to generally present the concept of the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

In order to provide a working frame of reference, first a glossary of terms used in the description and claims is given as a central resource for the reader. Second, an introduction is provided to give the reader a brief understanding of the present invention. Next, a discussion of various aspects of the present invention is provided to give an understanding of the specific details.

(1) GLOSSARY

Before describing the specific details of the present invention, a centralized location, i.e. a glossary, is provided in which various terms used herein and in the claims are defined. The glossary is used to provide the reader with a general understanding for the intended meaning of the terms, but it is not menat to convey the entire scope of each term. Rather, the glossary is intended to supplement the rest of the specification in more clearly explaining the terms used.

Activation Means—The term "activation means" refers to a mechanism or technique for transferring an actuation signal to a cell or group of cells. Non-limiting examples of actuation means include the use of a conductor such as a metallic wire, a chemical, a heat conducting material, a magnetic field, and an environment.

Active Material—The term "active material," also known as a smart material, refers to a material that changes its shape in response to an external control stimulus or actuation signal.

Cellular—The term "cellular" refers to a shape that consists of, or contains, a cell or cells. The unit cell is repeated throughout space to create the cellular geometry and, ultimately, the morphing cellular structure.

Morphing Cellular Structure—The term "morphing cellular structure" refers to a structure that consists of, or contains, a cell or cells and that includes at least one active material therein, allowing the structure to change its shape into at least one desired shape when an actuation signal is received. The morphing cellular structure may be comprised of a single active material, a single passive material, or multiple active and passive materials having either the same or different material combinations and either the same or different geometries.

Passive Material—The term "passive material" refers to an inert material that resists changing its shape in response to an external control stimulus. Passive materials may be used as structural members of the morphing cellular structure and cannot be deliberately changed in shape with a control signal.

(2) INTRODUCTION

The present invention comprises a morphing cellular structure using materials that exhibit recoverable or controllable strain (known as shape memory or active "smart" materials) when an actuation signal is actuated (e.g., applied or removed). The structure is made of at least one kind of active material or a composite of active and passive materials. The use of an active material to make the morphing cellular structure allows the structure to be expanded (deployed), or collapsed and reset (recovered) by actuating the active material. In essence, the cellular structure itself functions as an actuator, thereby simplifying a mobile system by minimizing the number of conventional actuators needed to achieve desirable results. The structure can be configured for a variety of applications. The following discussion describes the present invention in further detail, including a discussion of various, non-limiting, embodiments.

(3) DISCUSSION

A notable feature of the present invention is the configuration of an active material into unit cells having a cellular geometry. The cellular geometry is similar to a crystal system where points of lattice are located at the cell corners. There are seven different kinds of cell shapes that include all the possible point lattices. As such, the unit cells can be produced in various shapes to generate the cellular geometry, examples of which include cubic, tetragonal, Orthorhombic, rhombohedral, hexagonal, monoclinic, and triclinic. The unit cell is repeated to create the cellular geometry and, ultimately, the morphing cellular structure.

Although the cells are described as two dimensional (2-D) structures, the cells can be extruded to form a three-dimensional (3-D) structure. As such, the morphing cellular structure can be configured in a cellular shape that results in 3-D expansion and contraction properties.

Figure 1B:
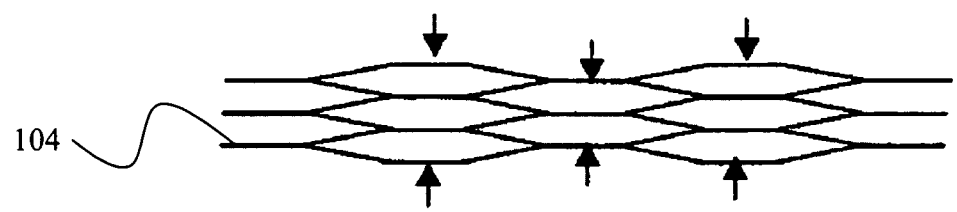
FIG. 1B illustrates a cellular structure that is made out of active materials in a collapsed state after external loading in the direction of the arrows.
Figure 1C:
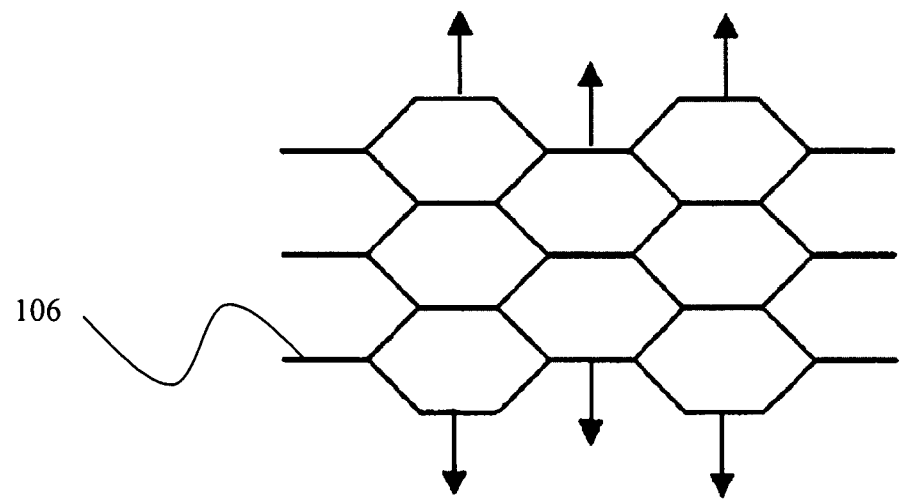
FIG. 1C illustrates a cellular structure that is made out of active materials in an expanded state, after actuating with motion in the direction of the arrows and returning to the shape depicted in FIG. 1A.

As shown in FIGS. 1A, 1B, and 1C respectively, a morphing cellular structure 100 is made of active materials that have a first state 102 (e.g., expanded state), and a second state 104 (e.g., contracted state), and that can in some configurations be reset to a memorized state 106 (recovered state).

The morphing cellular structure 100 comprises a group of unit cells with each unit cell configured to have a cellular geometry. The group of unit cells is formed of a first active material. For example, the cellular structure 100 may include a first active material with both a first state 102 (e.g., expanded) and a second state 104 (e.g., contracted), where the first state 102 has a different configuration (e.g., measured as a volume and/or shape) from the second state 104. As a specific example, each unit cell has a volume. The volume of each unit cell, while the first active material is in the first state 102, is different from the volume of each unit cell while the first active material is in the second state 104. The first state 102 and the second state 104 may be switched such that the first state 102 is a memorized state and the second state 104 is an altered state, or alternatively, such that the first state 102 is an altered state and the second state 104 is a memorized state. The first active material is responsive to a first actuation signal such that when the first actuation signal is actuated, the cellular geometry changes from the first state 102 to the second state 104.

The cellular structure is configured to be morphed by actuating (i.e., changing) the actuation signal in any suitable manner where a unit cell is responsive to the actuation signal. Non-limiting examples of which include the active material being a self-sensor and deforming when the actuation signal is sensed; the actuation signal being actively applied to all cells; the actuation signal being actively applied to a region of cells; the actuation signal being actively applied to a single cell; each cell being affected by actuation of a neighboring cell; and each cell providing an actuation signal to neighboring cells so that the receiving cells trigger their actuation on the state of the neighboring cell or on a propagated external signal transmitted through the neighboring cells.

The cellular structure 100 can be formed with the active material being deformable between numerous states. Non-limiting examples of which include being deformable from a first state 102 to a second state 104; being deformable from both a first state 102 to a second state 104 and from a second state 104 to a first state 102; and being deformable between a plurality of states. For example, when the active material is deformable from a first state 102 to a second state 104, the deformation may be a single deployment or, alternatively, be a resettable deployment where the active material is resettable through an external reset signal, allowing for at least one additional deployment.

As another non-limiting example, when the active material is deformable from both a first state 102 to a second state 104 and from a second state 104 to a first state 102, the deformation occurs between the states when the actuation signal is actuated. For example, the active material deforms from the first state 102 to the second state 104 upon receiving the actuation signal and, thereafter, deforms from the second state 104 to the first state 102 when the actuation signal is removed (i.e. "Powering Off"). Alternatively, the active material deforms from the first state 102 to the second state 104 when an actuation signal is removed and, thereafter, deforms from the second state 104 to the first state 102 when the actuation signal is received (i.e. "Powering On"). The actuation signal is any signal that causes a change in shape of an active material. Non-limiting examples of which include a temperature change, redox reaction, pH change, electromagnetic field, chemical reaction, electric current, electric field, and magnetic field. As another non-limiting example, the memorized state can also be forcedly altered, such as by bending the cellular structure to create a new memorized state.

Additionally, any number of active materials can be connected with the first active material. As a non-limiting example, a second active material may be connected with the first active material. The second active material may be responsive to the same or a different actuation signal than the first active material. In such an embodiment, a user can selectively alter the cellular structure 100 by using at least one of a plurality of actuation signals.

As described in further detail below, forming the active material into a shape having a cellular geometry is the basis for the morphing of the cellular structure of the present invention.

As shown in FIG. 2, a combination of passive materials 200 and active materials 202 can also be utilized to tailor the properties of the structure 100. The passive 200 and active 202 materials can be put together in any desirable configuration to create a cellular structure. As a non-limiting example, the passive material 200 can be positioned between active materials 202. In such an example, the active materials 202 can be actuated to change their shapes, while the passive materials 200 maintain their shapes. Another example is illustrated in FIG. 3, where the active materials 202 are attached with a stiff passive material 200 at a hinge joint 300. In this example, actuation of the active material 202 forces a bending moment at the hinge joint 300.

Figure 4:
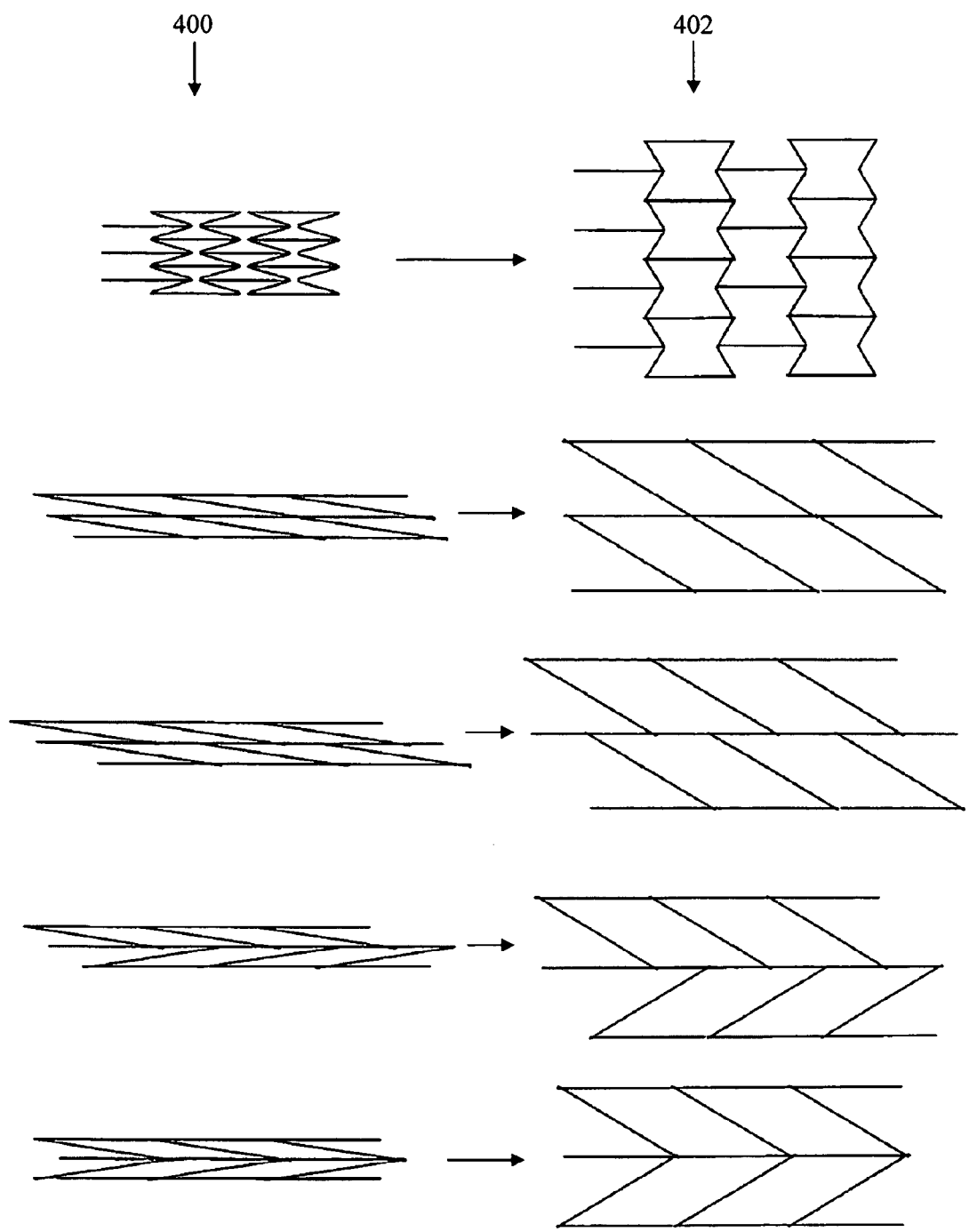
FIG. 4 illustrates several examples of cellular structures with different geometric shapes.

A wide range of morphing cellular geometries can be realized, with specific anisotropic structural properties tailored to a particular application. FIG. 4 illustrates non-limiting examples of several cellular geometric shapes, with configurations on the left side in a contracted state 400 and the corresponding configurations on the right side in an expanded state 402. An advantage of such a structure is that if it is deformed by external forces, it can be actuated with an actuation signal and returned to a known shape, which may be a default or an optimal configuration, with repeatable results and without the need for sensors.

(4) ACTIVE MATERIALS

Another novel feature of the present invention is that the morphing cellular structure is made out of various active materials. The active materials provide the morphing cellular structure with its unique morphing properties. Non-limiting examples of such active materials include shape memory alloys (SMAs), shape memory polymers (SMPs), piezoelectric bimorphs (PBs), conductive polymers (CPs), ionic polymer gels (IPGs), Ferromagnetic Shape Memory Alloys (FSMAs), Ionic Polymer Metal Composites (IPMCs), FerroMagnetics (FMs), hard piezos, Liquid Crystal Elastomers (LCEs), and Annealed Polyacrylonitrile (PAN) Fibers.

An embodiment detailed in this application utilizes SMPs, but the essential aspects of this concept are not limited to their use. Several alternate materials can also be utilized as substitute for the SMPs, such as SMAs and conductive polymers (CPs). SMAs, for example, can also be thermo-physically treated to change their shape when heat is applied and can be used in a contractible and re-deployable structure. The SMAs have several advantages and disadvantages with respect to SMPs and may be a better choice in some applications. In particular, the SMAs have significantly higher force capabilities, are intrinsically stiffer, and are electrically conductive (thus allowing resistance heating as an actuation mechanism). However, they exhibit significantly smaller strain recovery (~5%) relative to SMPs (often>200%), hence limiting the degree of structural expansion or storage. Non-limiting examples of SMAs include nickel-titanium-based alloys, indium-titanium-based alloys, nickel-aluminum-based alloys, nickel-gallium-based alloys, copper-based alloys, gold-cadmium-based alloys, iron-based alloys, or combinations comprising at least one of the aforementioned.

Non-limiting examples of SMPs include polyphosphazenes, poly(vinyl alcohols), polyamides, polyester amides, poly(amino acids), polyanhydrides, polycarbonates, polyacrylates, polyalkylene terephthalates, polyortho esters, polyvinyl ethers, polyvinyl esters, polyvinyl halides, polyesters, polyactide, polyglycolides, polysiloxanes, polyurethanes, polyethers, polyether amides, polyether esters, poly (methyl methacrylate), poly(hexyl methacrylate), poly(butyl methacrylate), poly(isobutyl methacrylate), poly(hexyl methacrylate), poly(butyl methacrylate), poly(isobutyl methacrylte), poly(phenyl methacrylate), poly(methyl acrylate), poly(isopropyl acrylate), poly(isobutyl acrylate), poly(octadecyl acrylate), polystyrene, polypropylene, polyvinyl phenol, polyvinyl pyrrolidone, chlorinated polybutylene, poly (octadecyl vinyl ether), ethylene vinyl acetate, polyethylene, poly(ethylene oxide), ply(ethylene terephthalate), polyethylene/nylon (graft copolymer), polycaprolactones-polyamide (block copolymer), poly(caprolactone dimethacrylate-n-butyl acrylate, poly(norbornyl-polyhedral oligomeric silsequioxane), polyvinyl chloride, urethane/butadiene copolymers, poluurethane block copolymers, styrene-butadiene-styrene block copolymers, and copolymers thereof.

Conductive polymers (CPs) may also be utilized. Non-limiting examples of CPs include polyanalines, polyacetylenes, polypyrroles, and polythiophenes. However, use of CPs with application of voltage, may result in oxidation or reduction. In the presence of the appropriate ions—typically in an aqueous environment—oxidation will cause the transport of these ions into the polymer to counteract the charge, resulting in a volume change. A reverse bias will reverse the volume change. If built into a cellular structure, this volume change, constrained by boundary conditions on the structure, would give rise to an expansion or contraction of the structure.

Several other active materials, such as ionic polymer metal composites (IPMCs), ionic polymer gels (IPGs), and Annealed Polyacrylonitrile (PAN) Fibers can also be included to operate in a suitable manner for expanding or contracting the morphing cellular structure. IPMCs are particularly useful because they provide an intrinsic bending moment, causing connection or "hinge" points within the structure to change relative orientations and cause expansion or contraction of the morphing cellular structure. An IPMC may comprise a polymer electrolyte membrane sandwiched between two metal electrodes. If a low voltage, for example between 1 and 10 volts, is applied across the electrodes, the resulting migration of the ions will cause the composite structure to bend. Non-limiting examples of IPMCs include nafion (perfluorosulfonate), flemion (perfluorocarboxylase), and conductive polyacrylonitrile. Non-limiting examples of IPGs include poly electrolyte gel, and polyacrylic acid. Annealed Polyacrylonitrile (PAN) Fibers change length (fiber volume) when the surrounding pH environment changes (shrinks in acidic environments and expands in basic environments).

Another example uses a piezoelectric bimorph (PB) in the structure. Non-limiting examples of which include reduced and internally-biased oxide wafer (RAINBOW) actuators and thin layer composite uni-morph ferro-electric driver and sensor (THUNDER) actuators. RAINBOWs are piezoelectric wafers with an additional heat treatment step to increase their mechanical displacements. In the RAINBOW process, typical piezoelectric wafers are further treated to causes one side of the wafer to become chemically reduced. This reduced layer cause the wafer to have internal strains that shape the once flat wafer into a dome. The internal strains cause the material to have higher displacements and higher mechanical strength than a typical piezoelectric wafer. THUNDER actuators are produced by Face International Corporation, located at 427 W. 35th St. Norfolk, Va. 23508, United States of America.

PBs are available commercially in a wide variety of configurations, but the general structure is a piezoelectric material bonded to or processed to be attached to a stiff passive backing material. When the piezoelectric material is "activated" by applying an electric field, the constrained expansion of the piezoelectric couples into the passive backing and produces a bending moment. This bending moment can be utilized at the connection or "hinge" points within the cellular structure to provide large changes in the volume of the structure. Bimorphs utilizing a number of other active materials have been demonstrated and would be suitable as enabling factors in a morphing cellular structure.

FIGS. 5A-5D are tables presenting properties of various active materials. The first column includes sample active materials. The second column includes an actuation signal to which the corresponding active material responds. The third column illustrates non-limiting examples of corresponding actuation means, the actuation means being a mechanism or technique for transferring an actuation signal to a cell or group of cells. The fourth column presents example deformations that occur with each type of illustrated active material. The fifth column provides several non-limiting examples of typical structural forms associated with the corresponding active material.

(5) EXAMPLE EMBODIMENTS

Mechanical structures can also be designed to expand and collapse. However, one of the advantages of a morphing cellular structure is that the active materials are used as structural members, actuators, and sensors. This simplifies the structure by replacing conventional actuators and sensors otherwise needed (subject to wear and tear). The properties of the current invention can be tailored by controlling the cell geometry and by combining active materials with passive materials to create expandable and contractible structures.

Expandable or contractible structures that can be reset to a prescribed (memorized) state can be useful in various applications (e.g., expandable structures for space and automotive applications, shape changing/morphing structures for aerospace applications).

A cellular structure made out of an active material is applicable to various technology areas. Some key features include the ability of the structure to passively hold its shape (zero-power hold), the ability to reset the structure to a memorized state, and the versatility to change the memorized state. Following are non-limiting examples of some potential applications of the current invention.

In space applications, the morphing cellular structure could be configured as a deployable structure, allowing the structure to be transported in its compact configuration and thereafter deployed by actuating the active material or by using a combination of other actuators and the deployable structure. For example, the morphing cellular structure can be antennae that is formed and shipped into space in a contracted position. Once positioned to its desired location, the antennae can be actuated and thereby deployed (expanded) to assume its functional form. Some advantages over existing deployable structures are that the structures described in this invention would be tailorable, reversible, and the structure itself could function as a sensor and actuator. Additionally, in some cases if the structure changes shape over time due to external forces/stresses acting on it, it can be actuated to return to its optimal configuration.

Figure 6:
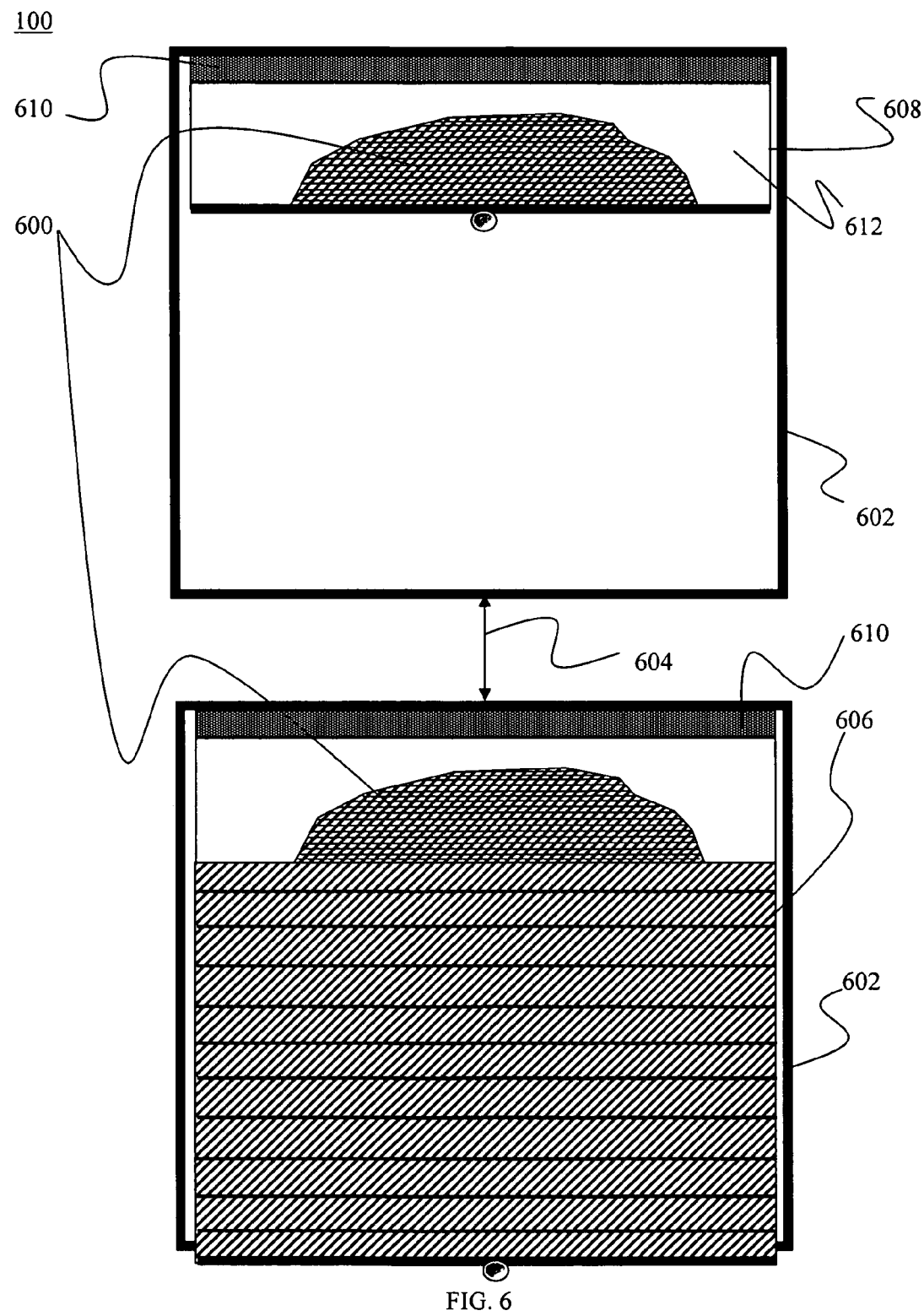
FIG. 6 illustrates a morphing cellular structure configured to function as deployable window shade according to the present invention.

Numerous automotive and home applications can be envisioned. For example, as shown in FIG. 6, the morphing cellular structure 100 could be incorporated into window shades/protective deployable curtains 600. In this aspect, the cellular structure is configured to be attached with a window 602 and function as part of a deployable window shade assembly, such that when an actuation signal is actuated, the cellular structure deploys and the window shade 600 changes 604 its shape with respect to the window 602. In its changed configuration, the deployable window shade 600 is deployed 606 across the window 602 to prevent light and/or other elements from passing through the window 602. Alternatively; the actuation signal can be actuated 604 to contract the window shade 600 from a deployed position 606 to a contracted position 608.

In this embodiment, the window shade 600 may optionally include a housing 610 that houses a mounting apparatus and various actuation components. A cover 612 is shown. The 612 cover could be either a storage apparatus for stowing the structure when it is in a contracted position 608 or, alternatively, be a flexible structure face sheet that covers the deployable portion of the window shade 600. In this illustration, the cover 612 is cut-away to show the stowed morphing cellular structure/deployable window shade 100/600 therein.

Figure 7:
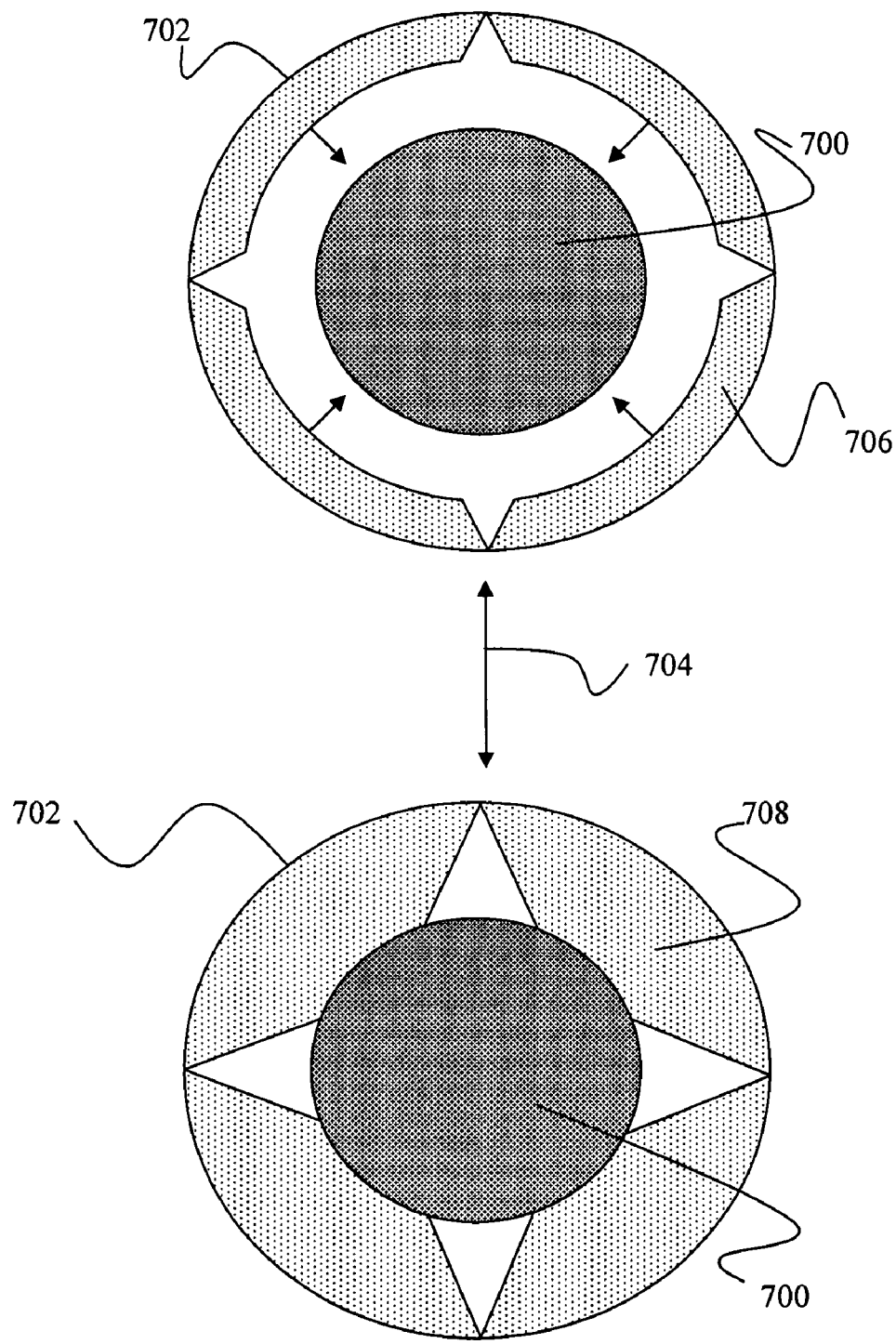
FIG. 7 is a top view of a morphing cellular structure configured to function as a cup holder according to the present invention.

As additional non-limiting examples, the cellular structure can be incorporated into resizable apertures such as cup holders and air passages. As shown in FIG. 7, the cellular structure 100 can be configured to change its shape to conform with a shape of an inserted cup 700. FIG. 7 illustrates a top-view of a cup-holder 702 according to the present invention. After a cup 700 is placed within the cup-holder 702, an actuation signal can be actuated to cause the cellular structure 100 to conform 704 its shape with the shape of the cup 700 and thereby more effectively hold the cup 700. Or alternatively, the actuation signal can be actuated to cause the cup-holder 702 to change 704 its shape to contract away from an inserted cup 700, essentially morphing between a stowed cellular structure position 706 and a deployed cellular structure position 708.

Figure 8:
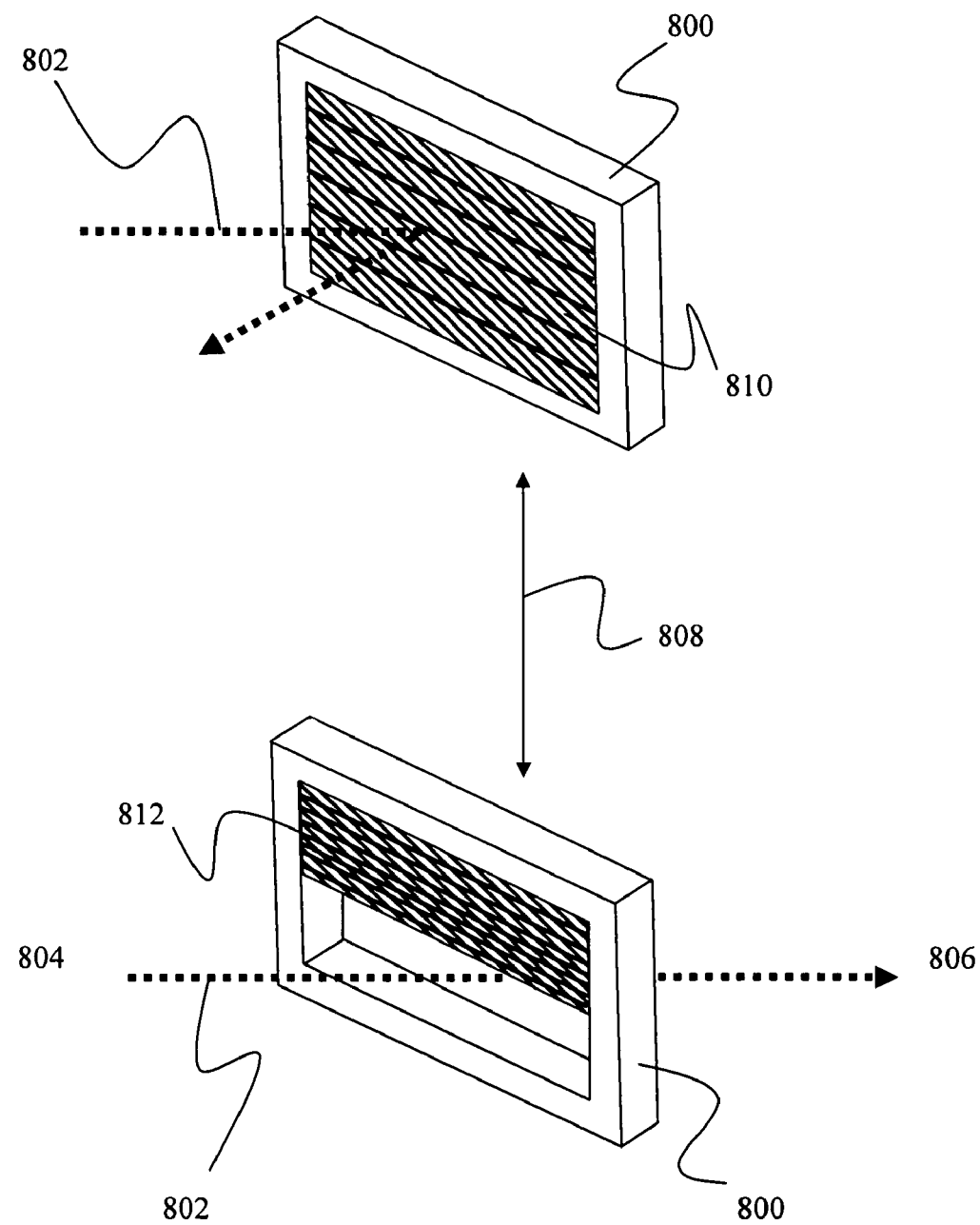
FIG. 8 is an illustration of a morphing cellular structure configured to function as an air passage.

As shown in FIG. 8, the cellular structure 100 can be configured in the shape of an air passage 800, such as a vent or grill, to allow air 802 to pass by it from a first side 804 to a second side 806. In this aspect, when an actuation signal is actuated, the air passage 800 changes 808 its shape to affect passage of air 802 through (or by) the air passage 800. For example, the air passage 800 could be a heating vent that allows heated air 802 to pass through the heating vent. When an actuation signal is applied, or unapplied, depending on the configuration, the heating vent is collapsed 810 to stop the flow of the heated air 802; or alternatively, the air passage 800 could be opened 812 to allow or resume the passage of air 802.

Figure 9:
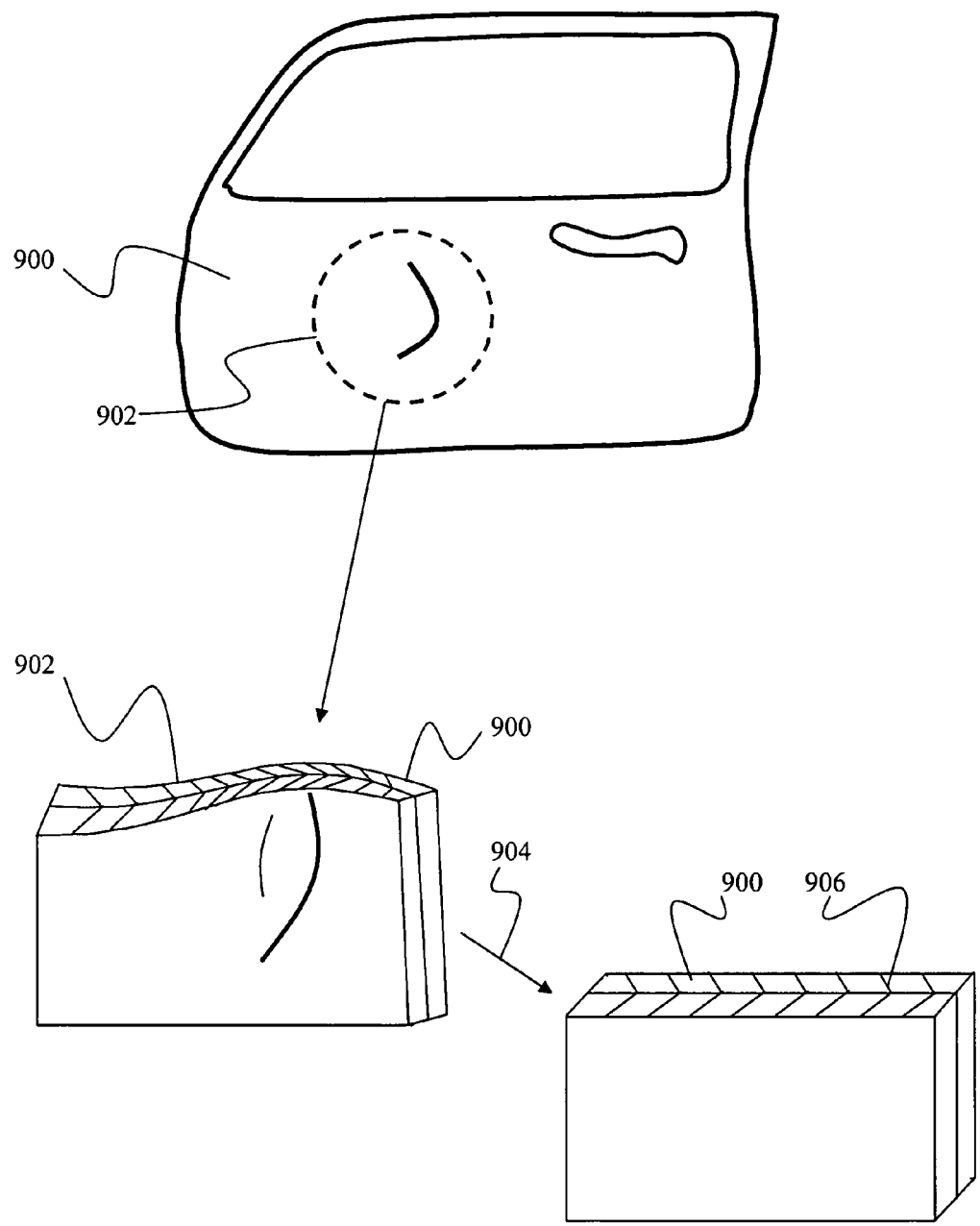
FIG. 9 is an illustration of a morphing cellular structure incorporated into an automobile surface panel.

As shown in FIG. 9, the active material could also be incorporated into automobile surfaces 900 where the cellular structure 100 is configured to function as an automobile surface panel 900. In the event that the automobile is damaged and the automobile surface panel 900 is deformed (e.g., dented) 902, an actuation signal can be applied to return 904 the surface to its previous configuration in an un-deformed shape 906.

The specific embodiments described above are not intended to be limiting and are for illustrative purposes only. As can be appreciated by one in the art, the morphing cellular structure can be incorporated into many embodiments.

What is claimed is:

1. A morphing cellular structure, comprising a group of unit cells with each unit cell having a cellular geometry, the group of unit cells formed of a first active material, where the first active material has a first state and a second state, and where each unit cell has a configuration where the configuration of each unit cell, while the first active material is in the first state, is different from the configuration of each unit cell while the first active material is in the second state, and where the first active material is responsive to a first actuation signal such that when the first actuation signal is actuated, the active material is deformed from the first state to the second state, thereby changing the configuration of each unit cell affected by the actuation of the first actuation signal and morphing the cellular structure, wherein the first actuation signal is a signal selected from a group consisting of a temperature change, redox reaction, pH change, electromagnetic field, chemical reaction, electric current, electric field, and magnetic field; and wherein the active material is deformable from both a first state to a second state and from a second state to a first state such that the deployment is a re-settable deployment where the active material is re-settable through an external reset signal, allowing for at least one additional deployment, the re-settable deformation being selected from a group of consisting of deforming from the first state to the second state upon receiving the first actuation signal and deforming from the second state to the first state when the first actuation signal is removed, and deforming from the first state to the second state when the first actuation signal is removed and deforming from the second state to the first state when the first actuation signal is received.

2. A morphing cellular structure as set forth in claim 1, wherein the configuration is measured as volume, where each unit cell has a volume where the volume of each unit cell, while the first active material is in the first state, is different from the volume of each unit cell while the first active material is in the second state.

3. A morphing cellular structure as set forth in claim 2, wherein the cellular geometry is selected from a group consisting of cubic, tetragonal, orthorhombic, rhombohedral, hexagonal, monoclinic, and triclinic.

4. A morphing cellular structure as set forth in claim 3, wherein the cellular structure is configured to be morphed by actuating the first actuation signal in a manner selected from a group consisting of the active material being a self-sensor and deforming when self-sensing the first actuation signal; the first actuation signal being actively applied to all cells; the first actuation signal being actively applied to a region of cells; the first actuation signal being actively applied to a single cell; the first actuation signal being actively removed; each cell being affected by a neighboring cell; and cells reacting to a first actuation signal from neighboring cells or a propagated signal.

5. A morphing cellular structure as set forth in claim 4, wherein the active material is a material selected from a group consisting of shape memory alloys, shape memory polymers, piezoelectric bimorph, ionic polymer metal composites, conductive polymers, ionic polymer gels, ferromagnetic shape memory alloys, ferromagenetics, liquid crystal elastomers, dielectric elastomers, polyacrylonitrile fibers, and hard piezos.

6. A morphing cellular structure as set forth in claim 5, wherein the morphing cellular structure has a size and each unit cell in the morphing cellular structure is between approximately one one-thousandths and one third of size of the morphing cellular structure.

7. A morphing cellular structure as set forth in claim 6, wherein the first state can be altered by forcedly altering the cellular geometry.

8. A morphing cellular structure as set forth in claim 7, further comprising a second group of unit cells connected with a first group of unit cells, with each unit cell configured to have a cellular geometry, the second group of unit cells formed of a second active material, where the second active material has both a third state and a fourth state, and where each unit cell has a volume where a volume of each unit cell while the second active material is in the third state is different from the volume of each unit cell while the second active material is in the fourth state, and where the second active material is responsive to a second actuation signal such that when the second actuation signal is actuated, the second active material is deformed from the third state to the fourth state, thereby changing the volume of each unit cell receiving the second actuation signal and morphing the cellular structure, thereby allowing a user to selectively morph the cellular structure by using at least one of the first and second actuation signals.

9. A morphing cellular structure as set forth in claim 8, further comprising a passive material connected with the active material.

10. A morphing cellular structure as set forth in claim 9, wherein the active material is attached between at least two sections of passive material such that the active material functions as a hinge joint, whereby actuation of the active material forces a bending moment at the hinge joint.

11. A morphing cellular structure as set forth in claim 9, wherein the active material is attached with the passive material at a hinge joint such that actuation of the active material forces a bending moment at the hinge joint.

12. A morphing cellular structure as set forth in claim 9, wherein the cellular structure is configured to be a deployable structure.

13. A morphing cellular structure as set forth in claim 9, wherein the cellular structure is configured to be attached with a window and function as a deployable window shade, such that when the first actuation signal is applied, the deployable window shade changes its shape to change its configuration with respect to the window.

14. A morphing cellular structure as set forth in claim 9, wherein the cellular structure is configured to hold a cup and change its shape to conform its shape with a shape of an inserted cup, whereby after a cup is placed within the cellular structure, the first actuation signal can be applied to cause the cellular structure to conform its shape with the shape of the cup.

15. A morphing cellular structure as set forth in claim 9, wherein the cellular structure is configured to function as an air passage having a first side and a second side, and formed in such a shape that actuation of the air passage affects the flow of air from the first side to the second side, whereby when the first actuation signal is applied, the air passage changes its shape to affect passage of air through the air passage.

16. A morphing cellular structure as set forth in claim 9, wherein the cellular structure is configured to be used as an automobile surface, allowing a deformed automobile surface to return to an un-deformed state when the first actuation signal is actuated.

17. A morphing cellular structure as set forth in claim 1, wherein the cellular structure is configured to be morphed by receiving the first actuation signal in a manner such that the active material is a self-sensor and deforming when self-sensing the first actuation signal.

18. A morphing cellular structure as set forth in claim 1, wherein the first state can be altered by forcedly altering the cellular geometry.

19. A morphing cellular structure as set forth in claim 1, wherein the active material is a material selected from a group consisting of shape memory polymers, piezoelectric bimorph, ionic polymer metal composites, conductive polymers, ionic polymer gels, liquid crystal elastomers, dielectric elastomers, and hard piezos.

20. A morphing cellular structure as set forth in claim 1, further comprising a second group of unit cells connected with a first group of unit cells, with each unit cell configured to have a cellular geometry, the second group of unit cells formed of a second active material, where the second active material has both a third state and a fourth state, and where each unit cell has a volume where a volume of each unit cell while the second active material is in the third state is different from the volume of each unit cell while the second active material is in the fourth state, and where the second active material is responsive to a second actuation signal such that when the second actuation signal is applied, the second active material changes from the third state to the fourth state, thereby allowing a user to selectively morph the cellular structure by using at least one of the first and second actuation signals.

21. A morphing cellular structure as set forth in claim 1, further comprising a passive material connected with the active material.

22. A morphing cellular structure as set forth in claim 21, wherein the active material is attached with the passive material at a hinge joint such that actuation of the active material forces a bending moment at the hinge joint.

23. A morphing cellular structure as set forth in claim 21, wherein the active material is attached between at least two sections of passive material such that the active material functions as a hinge joint, whereby actuation of the active material forces a bending moment at the hinge joint.

24. A morphing cellular structure as set forth in claim 1, wherein the cellular structure is configured to be a deployable structure.

25. A morphing cellular structure as set forth in claim 1, wherein the cellular structure is configured to be attached with a window and function as a deployable window shade, such that when the first actuation signal is applied, the deployable window shade changes its shape to change its configuration with respect to the window.

26. A morphing cellular structure as set forth in claim 1, wherein the cellular structure is configured to hold a cup and change its shape to conform its shape with a shape of an inserted cup, whereby after a cup is placed within the cellular structure, the first actuation signal can be applied to cause the cellular structure to conform its shape with the shape of the cup.

27. A morphing cellular structure as set forth in claim 1, wherein the cellular structure is configured to function as an air passage having a first side and a second side, and formed in such a shape that actuation of the air passage affects the flow of air from the first side to the second side, whereby when the first actuation signal is applied, the air passage changes its shape to affect passage of air through the air passage.

28. A morphing cellular structure as set forth in claim 1, wherein the cellular structure is configured to be used as an automobile surface, allowing a deformed automobile surface to return to an un-deformed state when the first actuation signal is applied.

29. A morphing cellular structure as set forth in claim 1, wherein the cellular geometry of the cells in the group of unit cells is non-symmetrical.

30. A morphing cellular structure as set forth in claim 1, wherein each unit cell is extruded to form a three-dimensional (3-D) structure such that the morphing cellular structure allow for 3-D expansion and contraction.

31. A morphing cellular structure, comprising a group of unit cells with each unit cell having a cellular geometry, the group of unit cells formed of a first active material, where the first active material has a first state and a second state, and where each unit cell has a configuration where the configuration of each unit cell, while the first active material is in the first state, is different from the configuration of each unit cell while the first active material is in the second state, and where the first active material is responsive to a first actuation signal such that when the first actuation signal is actuated, the active material is deformed from the first state to the second state, thereby changing the configuration of each unit cell affected by the actuation of the first actuation signal and morphing the cellular structure; and;

wherein the cellular geometry of the cells in the group of unit cells is an auxetic cellular geometry.

* * * * *